United States Patent
Parnell

(10) Patent No.: US 10,956,907 B2
(45) Date of Patent: Mar. 23, 2021

(54) AUTHORIZATION OF TRANSACTIONS BASED ON AUTOMATED VALIDATION OF CUSTOMER SPEECH

(71) Applicant: Datalogic USA, Inc., Eugene, OR (US)

(72) Inventor: William L. Parnell, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 14/328,477

(22) Filed: Jul. 10, 2014

(65) Prior Publication Data
US 2016/0012446 A1    Jan. 14, 2016

(51) Int. Cl.
| | |
|---|---|
| G06Q 20/40 | (2012.01) |
| G06Q 20/20 | (2012.01) |
| G06Q 20/34 | (2012.01) |
| G06F 21/32 | (2013.01) |
| G06Q 20/32 | (2012.01) |
| G10L 17/22 | (2013.01) |
| G10L 17/04 | (2013.01) |

(52) U.S. Cl.
CPC ....... *G06Q 20/40145* (2013.01); *G06F 21/32* (2013.01); *G06Q 20/20* (2013.01); *G06Q 20/206* (2013.01); *G06Q 20/3272* (2013.01); *G06Q 20/341* (2013.01); *G10L 17/22* (2013.01); *G10L 17/04* (2013.01)

(58) Field of Classification Search
CPC combination set(s) only.
See application file for complete search history.

(56) References Cited

U.S. PATENT DOCUMENTS

| | | | |
|---|---|---|---|
| 5,892,900 A | 4/1999 | Ginter et al. | |
| 6,601,762 B2 * | 8/2003 | Piotrowski | G07F 7/1008 235/382 |
| 7,286,813 B1 * | 10/2007 | Cook | 455/403 |
| 8,266,451 B2 | 9/2012 | Leydier et al. | |
| 8,594,636 B2 | 11/2013 | Lewis | |
| 8,646,060 B1 * | 2/2014 | Ben Ayed | 726/9 |
| 8,650,118 B2 | 2/2014 | Balasubramanian et al. | |
| 9,240,178 B1 * | 1/2016 | Nadolski | G10L 13/04 |

(Continued)

OTHER PUBLICATIONS

Merriam-Webster definition of "metric" (Dec. 22, 2013).*

(Continued)

*Primary Examiner* — Peter Ludwig
(74) *Attorney, Agent, or Firm* — Cozen O'Connor

(57) ABSTRACT

A voice authentication transaction system may receive, as part of an authorization request to authorize a transaction of the customer, information that specifies an identity of the customer and a sample of the customer's speech. The system may generate various voice information based on the specified speech sample, and may determine whether to authorize the transaction based at least in part on validating the speech sample, such as by comparing the generated voice information with stored voice reference information already associated with the indicated customer identity. The customer may present a portable instrument such as a mobile device or smartcard to a point-of-sale terminal, and the portable instrument may include securely stored voice reference information for comparison with the voice information generated based on the provided speech sample. The voice reference information may be securely stored by a remote server.

24 Claims, 4 Drawing Sheets

(56) References Cited

U.S. PATENT DOCUMENTS

| | | | |
|---|---|---|---|
| 9,818,407 B1* | 11/2017 | Secker-Walker | G10L 15/32 |
| 2002/0019811 A1* | 2/2002 | Lapsley | G06Q 20/02 |
| | | | 705/44 |
| 2002/0190124 A1* | 12/2002 | Piotrowski | 235/382 |
| 2003/0046083 A1* | 3/2003 | Devinney et al. | 704/273 |
| 2003/0046554 A1* | 3/2003 | Leydier et al. | 713/186 |
| 2004/0136419 A1* | 7/2004 | Robinson | H01S 5/0014 |
| | | | 372/29.02 |
| 2005/0042983 A1* | 2/2005 | Borgward | 455/3.06 |
| 2005/0075985 A1* | 4/2005 | Cartmell | G06Q 20/04 |
| | | | 705/67 |
| 2005/0150945 A1* | 7/2005 | Choi | G06Q 20/108 |
| | | | 235/379 |
| 2006/0178879 A1* | 8/2006 | Murveit | G10L 15/08 |
| | | | 704/231 |
| 2007/0022058 A1* | 1/2007 | Labrou | G06Q 20/32 |
| | | | 705/67 |
| 2007/0179789 A1* | 8/2007 | Bennett | G06F 17/2775 |
| | | | 704/270.1 |
| 2008/0040262 A1* | 2/2008 | D K et al. | 705/39 |
| 2008/0046366 A1* | 2/2008 | Bemmel | G06Q 20/20 |
| | | | 705/44 |
| 2008/0256613 A1* | 10/2008 | Grover | 726/5 |
| 2009/0323906 A1* | 12/2009 | Jaiswal et al. | 379/88.02 |
| 2012/0084078 A1* | 4/2012 | Moganti et al. | 704/201 |
| 2012/0197429 A1* | 8/2012 | Nykyforov | G06T 7/0004 |
| | | | 700/138 |
| 2012/0252411 A1* | 10/2012 | Johnsgard et al. | 455/411 |
| 2013/0290136 A1 | 10/2013 | Sheets et al. | |
| 2014/0172430 A1* | 6/2014 | Rutherford | G06Q 20/20 |
| | | | 704/273 |
| 2014/0372128 A1* | 12/2014 | Sheets et al. | 704/273 |
| 2015/0088746 A1* | 3/2015 | Hoffman | 705/44 |
| 2015/0121499 A1* | 4/2015 | Suwald | G06F 21/32 |
| | | | 726/7 |
| 2015/0128240 A1* | 5/2015 | Richards et al. | 726/7 |

OTHER PUBLICATIONS

Reynolds, D., et al, "Robust Text-Independent Speaker Identification Using Gaussian Mixture Speaker Models," IEEE Transactions on Speech and Audio Processing, vol. 3, No. 1, Jan. 1995, pp. 72-83.

Beigi, "Chapter 1: Introduction," in *Fundamentals of Speaker Recognition*, New York, Springer Science + Business Media, 2011, 2 pages.

Campbell, Jr., "Speaker Recognition: A Tutorial," *Proceedings of the IEEE* 85(9):1437-1462, Sep. 1997.

Chen et al., "Evaluation Metrics for Language Models," Research Showcase @ CMU, Carnegie Mellon University, 1998, 7 pages.

Extended European Search Report dated Oct. 1, 2015 for corresponding EP Application No. 15176115.2, 11 pages.

Gaikwad et al., "A Review on Speech Recognition Technique," *International Journal of Computer Applications* 10(3): Nov. 16-24, 2010.

Smart Card Alliance, "Smart Cards and Biometrics," A Smart Card Alliance Physical Access Council White Paper, Published Mar. 2011, 26 pages.

* cited by examiner

AUTHORIZATION OF TRANSACTIONS BASED ON AUTOMATED VALIDATION OF CUSTOMER SPEECH

BACKGROUND

1. Technical Field

The present disclosure relates to transaction systems, for example point-of-sale (POS) transaction systems or terminals and, in particular, to techniques for enabling secure transactions.

2. Description of the Related Art

Authentication of a customer's identity can be an important aspect of processing a transaction at a point of sale. For example, when a customer is purchasing goods or services using credit or debit cards, an accurate determination of the customer's identity confirms that the transaction is legitimate, and that person authorizing or making the transaction is who the person purports to be.

There are a wide range of methods currently employed to authenticate customer identity, such the use of paper and other physical credentials (driver licenses, ID cards, passports, etc.). However, non-automated processes for verifying these credentials may be time consuming, may not always be performed, and is open to fraud and manipulation. Furthermore, such processes are impractical or even impossible for use in verifying an identity of a customer at non-traditional points-of-sale, such as retailer Web sites, Internet sales or other facilities for initiating online commercial transactions from a customer.

BRIEF SUMMARY

A point-of-sale terminal may be summarized as including a voice authentication transaction (VAT) system may receive, as part of an authorization request to authorize a financial or other transaction of the customer, information that specifies an identity of the customer and a sample of the customer's speech (such as, for example, via a microphone of the point-of-sale terminal). The VAT system may generate various voice information based on the speech sample, such as by digitally recording the speech sample and/or by generating various vocal metrics. The point-of-sale terminal may determine whether to authorize the transaction based at least in part on validating the speech sample, such as by comparing the generated voice information with stored voice reference information already associated with the indicated customer identity. For example, the customer may present a portable instrument such as a mobile device or smartcard to the point-of-sale terminal, and the portable instrument may include the stored voice reference information for comparison with the voice information generated based on the provided speech sample.

In some applications, the voice reference information may be stored by a remote server, and the point-of-sale terminal may provide the generated voice information to the remote servers for analysis and validation based on the stored voice reference information. In other applications, the voice reference information may be stored by a remote server, and the point-of-sale terminal may instead provide the indicated customer identity to the remote server and request the stored voice reference information for that customer identity, such that the point-of-sale terminal performs the analysis and validation locally.

The VAT system may be included in a client-side point-of-sale terminal, such as in a mobile device or computing system of the customer. Alternatively or additionally, the VAT system may be included as part of a merchant's online storefront or Web site.

A method of operation of a voice authentication transaction (VAT) system may be summarized as including receiving an authorization request to authorize one or more transactions of a customer, wherein the request specifies information that indicates an identity of the customer and generated voice information that represents at least one speech sample provided by the customer when initiating the one or more transactions at a first time; electronically retrieving, based at least in part on the indicated customer identity, stored voice reference information that represents a reference speech sample and that is associated with the customer identity prior to the first time; electronically analyzing the generated voice information, wherein the electronic analyzing of the generated voice information includes a comparison of the generated voice information with the stored voice reference information; determining, based at least in part on the electronic analyzing of the generated voice information, whether to authorize the one or more transactions; and if it is determined to authorize the one or more transactions, providing an indication that the one or more transactions are authorized, and otherwise providing an indication that the one or more transactions are not authorized.

Electronically retrieving the stored voice reference information may include accessing the stored voice reference information via a portable instrument that is presented by the customer to a merchant associated with the one or more transactions. The portable instrument may be a mobile device of the customer, and accessing the stored voice reference information via the portable instrument may include accessing one or more secured databases that are stored on the mobile device. The portable instrument may be a secured smart card of the customer, and accessing the stored voice reference information via the portable instrument may include accessing the secured smart card.

Electronically retrieving the stored voice reference information may include retrieving the stored voice reference information from one or more remote servers that are located remotely with respect to the customer at the first time. The method may be performed by at least one processor that is located in a point-of-sale terminal of a merchant associated with the one or more transactions, and the electronic retrieving of the stored voice reference information may include receiving the stored voice reference information from the one or more remote servers in response to a request from the point-of-sale terminal based on the indicated customer identity. The method may be performed by at least one processor located in one of the one or more remote servers, and receiving of the authorization request may include receiving the authorization request from a point-of-sale terminal of a merchant associated with the one or more transactions. The reference speech sample may be provided by the customer as part of enrolling in a financial protection program operated by an entity associated with the one or more remote servers, and the receiving of the authorization request may include receiving the generated voice information from a point-of-sale terminal of a merchant associated with the one or more transactions.

The method may further include generating, based at least in part on the at least one speech sample, at least some of the generated voice information. The generating of the at least some of the generated voice information may include generating one or more vocal metrics based on the at least one speech sample. The generated voice information may include a digital recording of at least some of the at least one speech sample, and the generating of the at least some of the generated voice information may include electronically recording the at least some of the at least one speech sample to generate the digital recording. The method may further include receiving additional generated voice information based at least in part on the digital recording, and the electronically analyzing of the generated voice information may include electronically analyzing the additional generated voice information.

Receiving the request specifying the generated voice information may include receiving one or more vocal metrics based on the at least one speech sample.

An automated voice authentication transaction system may be summarized as including at least one non-transitory processor-readable medium and at least one processor communicatively coupled to the at least one non-transitory processor-readable medium, wherein during operation the at least one processor: receives an indication of a request from a customer to authorize a transaction; receives generated voice information representative of a speech sample to be validated, the speech sample obtained from the customer and associated with the indicated request; based at least in part on a specified identity of the customer, retrieves stored voice reference information that represents a reference speech sample and that is associated with the specified customer identity prior to the receiving of the indicated request; validates the speech sample obtained from the customer based at least on the generated voice information and on the stored voice reference information; based at least in part on the validation of the obtained speech sample, determines whether to authorize the transaction; and, if it is determined to authorize the transaction, provides an indication that the transaction is authorized, and otherwise provides an indication that the transaction is not authorized.

The stored voice reference information may be stored on a portable instrument that is presented by the customer to a merchant associated with the one or more transactions, and during operation the at least one processor may access the stored voice reference information via the portable instrument. The portable instrument may be a mobile device of the customer, and the stored voice reference information may be stored in one or more secured databases of the mobile device. The portable instrument may be a secured smart card of the customer.

The stored voice reference information may be stored on one or more remote servers that are located remotely with respect to the customer at the first time. The at least one processor may be located in a point-of-sale terminal of a merchant associated with the one or more transactions, and the stored voice reference information may be received from the one or more remote servers in response to a request from the point-of-sale terminal based on the indicated customer identity. The at least one processor may be located in one of the one or more remote servers, and the authorization request may be received from a point-of-sale terminal of a merchant associated with the one or more transactions. The reference speech sample may be provided by the customer as part of enrolling in a financial protection program operated by an entity associated with the one or more remote servers.

During operation, the at least one processor may generate at least some of the generated voice information based at least in part on the at least one speech sample. The at least some of the generated voice information may include one or more vocal metrics based on the at least one speech sample.

The generated voice information may include a digital recording of at least some of the at least one speech sample.

During operation, the at least one processor may provide one or more prompts to the customer in response to the indicated request, and the at least one speech sample may be obtained from the customer in response to the one or more prompts.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
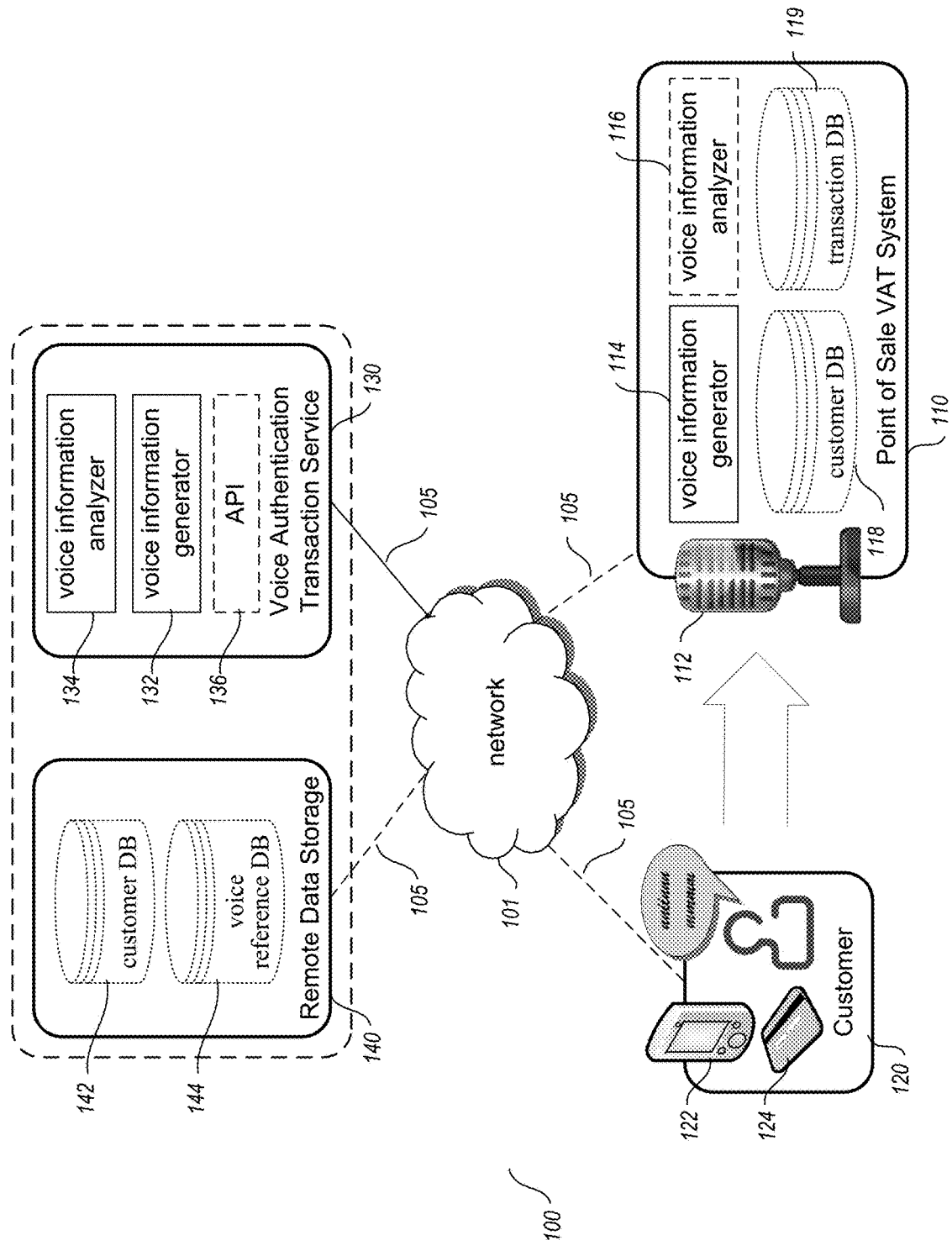
FIG. 1 is a network diagram illustrating an example implementation of interactions related to a Voice Authentication Transaction system in accordance with the techniques described herein.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with machine-readable symbol reader systems have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein (i.e., in this specification and the appended claims), the singular forms "a," "an," and "the" include plural referents unless the content clearly dictates otherwise.

It should also be noted that the term "or" is generally employed in its broadest sense, that is, as meaning "and/or" unless the content clearly dictates otherwise.

As used herein, a "transaction" may include any commercial transaction, financial transaction, legal transaction, or other transaction. A "customer" may include any individual or entity capable of initiating a commercial, financial, legal, or other transaction, and in at least some scenarios may also include any individual or entity capable of providing audible speech, such as in support of or ancillary to the initiation of such transactions. A "user" may include individual users of a computing system or any other entity interacting with the computing system on behalf of an individual user, including past, future or current users, and may also be used interchangeably with "customer," regardless of whether the referenced customer is interacting or has interacted with any such computing system. Reference herein to a "user" or "customer" without further designation may include a single person, or in some situations a group of affiliated persons, and may, depending on the context in which the term is used, refer to single or multiple entities.

Also as used herein, the term "merchant" may include any entity with which a customer is engaged or may engage in a transaction. For example, a merchant may be regularly or irregularly engaged in the sale or other transfer of products or services in exchange for a monetary payment or other remuneration; a charitable, political, or other organization engaged in solicitation of monetary payment or other remuneration on behalf of the organization or other parties; etc. Reference herein to a "merchant" without further designation may include a single entity or multiple entities.

The headings and Abstract of the Disclosure provided herein are for convenience only and do not interpret the scope or meaning of the embodiments.

Embodiments of the present disclosure provide techniques for the validation of audible speech samples provided for purposes of authorizing various types of transactions. Such transactions may include sale or other financial transaction for which payment is made using a credit instrument such as a smart card, credit card, debit card, check, etc. However, techniques described herein are also applicable to all transactions (including non-credit transactions such as cash transactions) in which it is desirable or necessary to verify one or more aspects of a party's identity. Such transactions may include, as non-limiting examples: transactions that require evidence of a buyer's age (e.g., the sale of tobacco products, alcohol, firearms); access to age-based resources (e.g., admission to gambling venues or other entertainment venues, or access to other adult entertainment resources, including physical or electronic resources); access to citizenship-based, national or other geography-based resources; etc. Some or all of the techniques described herein may be performed by automated operations of an implementation of a Voice Authentication Transaction system, as discussed in greater detail below.

FIG. 1 shows a networked environment 100 that includes a point-of-sale Voice Authentication Transaction system 110 as well as various systems and entities communicatively coupled to and/or interacting with the point-of-sale VAT system, including a customer 120, Voice Authentication Transaction service 130, and a remote data storage service 140. With respect to at least some implementations discussed below, the described techniques may be performed in the absence of at least some of the depicted systems and entities. For example, the point-of-sale VAT system 110 may be operated by or otherwise associated with one or more merchants (not shown), may be operated by or otherwise associated with the VAT service 130, or both. Furthermore, the point-of-sale VAT system may be included in one or more devices associated with and/or operated by one or more customers, such as to enable secure transactions based on voice recognition of those customers.

The illustrated example shows a single customer 120 interacting with the point-of-sale VAT system 110, such as by initiating one or more transactions associated with the lease, rental, sale or other transfer of goods or services to the customer by that merchant.

As a first example described with reference to FIG. 1, a merchant operates or provides point-of-sale VAT system 110 as part of a physical retail establishment, and the customer 120 interacts with the point-of-sale VAT system 110 in order to purchase a collection of goods (not shown) from that establishment. The point-of-sale VAT system includes a microphone 112, a voice information generator 114, a voice information analyzer 116, a customer database 118, and a transaction database 119. The customer 120 may possess a mobile device 122 and/or a smartcard 124. In the current example, as part of initiating her purchase, the customer approaches the point-of-sale VAT system with the goods to be purchased. In certain scenarios, the customer may speak to an operator of the point-of-sale VAT system or other nearby persons in regular conversation. In other scenarios, the point-of-sale VAT system or a human sales agent of the merchant (not shown) may prompt the customer to speak, either in relation to her purchase of the goods or on an unrelated topic. For example, the point-of-sale system may provide a textual or audiovisual prompt on a display screen, an audible prompt using a loudspeaker that is incorporated within or communicatively coupled to the system, or other appropriate prompt. In either case, the point-of-sale VAT system uses microphone 112 as an audio transducer to capture the sample of the customer's speech provided by the customer as she initiates her purchase. The voice information generator 114 digitally records the speech sample, and in addition may generate one or more vocal metrics that further qualitatively or quantitatively represents the speech sample.

As part of initiating her purchase, the customer 120 provides an indication of her identity as well as relevant payment information (e.g., bank account information, credit card information, or other information indicating a particular manner of payment to use for the purchase). In this first example, the customer additionally provides voice reference information that has been previously associated with her identity and stored in a secure portable instrument she provides to the point-of-sale VAT system. The voice reference information may include a digital recording of a prior speech sample from the customer, other information representative of the prior speech sample, one or more vocal metrics based on the prior speech sample, or some combination of these. In certain embodiments, high levels of confidence in a customer's identity may be achieved using voice recognition analysis of speech samples having lengths of approximately 5 seconds regardless of the particular words uttered by the speaker.

In this first example, the customer 120 presents secure smartcard 124, which includes information indicative of the customer's identity, the payment information to be used for purchasing the desired goods, and stored voice reference information to be used for validation of the new speech sample and authorization of payment. In certain scenarios, the customer may present her mobile device 122, which may store some or all of the information described above with respect to the smartcard 124, or which may only supplement information stored by the presented smartcard. The information may be stored in one or more encrypted and/or secured databases.

Continuing the first example, the point-of-sale VAT system 110 accesses the information presented by the customer via smartcard 124. The point-of-sale VAT system 110 uses voice information analyzer 116 to validate the speech sample provided by the customer as part of initiating the current purchase. For example, the point-of-sale VAT system 110 may compare the generated voice information from the voice information generator 114 to the voice reference information stored within the customer's smartcard. The voice information analyzer may, for example, provide an indication of a likelihood that the current provided speech sample originates from the indicated customer identity. The VAT system may, for example, provide an indication (e.g., YES/NO, Approved/Declined) that a speech sample has been validated if the indicated likelihood satisfies a predetermined threshold (e.g., 95%, 98%, etc.).

If the provided speech sample is successfully validated, the point-of-sale VAT system may provide an indication that the transaction is authorized in one or more manners. For example, the VAT system may provide a visual or audiovisual indication to the customer that the transaction is successful. The VAT system may additionally or alternatively provide an indication of the transaction authorization to a banking institution associated with the customer, to one or more intermediate payment facilitation services, etc. In some implementations, the VAT system may determine whether the initiated transaction is authorized based on one or more factors in addition to validation of the provided speech sample. For example, the authorization may further depend on information received from the customer's banking institution; additional information to be provided by the customer (such as photo identification, signature, etc.); other biometric information; or other appropriate factors.

If the provided speech sample is not successfully validated, the point-of-sale VAT system 110 may provide one or more indications to the customer that the transaction is unauthorized, and optionally perform one or more additional activities. For example, the point-of-sale VAT system 110 may prompt the customer to provide an additional current speech sample for validation. Also for example, the point-of-sale VAT system 110 may enable the customer to seek authorization of the transaction in an alternative manner. As a further example, the point-of-sale VAT system 110 may decline to complete the attempted purchase. In addition, the point-of-sale VAT system may perform various recordkeeping activities whether the attempted transaction is authorized or declined. For example, the point-of-sale VAT system 110 may update or cause to be updated one or more databases associated with the point-of-sale VAT system 110 or the associated merchant. For instance, the point-of-sale VAT system 110 may update one or both of the customer database 118 and transaction database 119.

As a second example described with reference to the illustrated embodiment of FIG. 1, the point-of-sale VAT system 110 is operated in conjunction with a Voice Authentication Transaction (VAT) service 130. The VAT service 130 includes a voice information generator 132 and a voice information analyzer 134. In certain embodiments, the VAT service 130 may perform or supplement particular functionality described in the first example above as being provided by the point-of-sale VAT system, as well as particular functionality described in the first example as being provided by a mobile device 122 or smartcard 124 presented by the customer. For this second example, the point-of-sale VAT system 110 includes microphone 112 and voice information generator 114, but may not include voice information analyzer 116, as described in greater detail below.

As above, the customer 120 approaches the point-of-sale VAT system 110 at a merchant's physical retail location with goods to be purchased. The point-of-sale VAT system 110 uses microphone 112 to capture a sample of the customer's speech, either during the customer's unrelated conversation while in audible proximity to the point-of-sale VAT system 110 or in response to one or more prompts provided to the customer after she indicates her desire to initiate a sale transaction. In this example, the point-of-sale VAT system 110 is connected to the VAT service 130 via network links 105 and network 101. As above, voice information generator 114 generates voice information by digitally recording the provided speech sample. The voice information generator 114 may additionally generate one or more vocal metrics that further qualitatively or quantitatively represents the speech sample as part of generating that voice information. In this second example, the customer provides only an indication of her identity and the relevant payment information in order to initiate the sale transaction, and does not provide access to a mobile device or smartcard containing pre-existing voice reference information.

The point-of-sale VAT system 110 transmits a payment authorization request to the VAT service 130, specifying the indicated customer identity and including at least some of the voice information generated by the voice information generator 114 based on the customer's provided speech sample. Upon receiving the request from the point-of-sale VAT system 110, the VAT service 130 uses the indicated customer identity to retrieve voice reference information associated with that customer identity. For example, the VAT service 113 may request the voice reference information from the remote data storage 140 which may include a customer database 142 and a voice reference database 144. The remote data storage may be integrated as part of the VAT service 130. Alternatively, the remote data storage 140 may comprise one or more third-party remote data storage services.

Once the stored voice reference information is received from the remote data storage by the VAT service, voice information analyzer 134 attempts to validate the speech sample provided by the customer via the point-of-sale VAT system. The point-of-sale VAT system may not utilize or even include voice information analyzer 116, instead relying on the VAT service 130 and voice information analyzer 134 to validate the provided speech sample. In doing so, voice information analyzer 134 may only use the voice reference information retrieved from remote data storage 140 and the generated voice information included in the payment authorization request. Alternatively, the voice information analyzer 134 may use one or more additional vocal metrics, generated by voice information generator 132 based on the information generated by voice information generator 114 and included in the payment authorization request.

In other implementations, upon receiving the voice reference information from the remote data storage 140, the VAT service 130 may, in response to the authorization request from the point-of-sale VAT system 110, forward the voice reference information to the point-of-sale VAT system 110 for use in validating the provided speech sample. In such implementations, the point-of-sale VAT system 110 uses voice information analyzer 116 to attempt to validate the provided speech sample in a manner similar to that described above with respect to the first example, utilizing the voice reference information forwarded from the VAT service 130 rather than retrieving such reference information by accessing a portable instrument presented by the customer.

In at least some implementations in which the validation of the speech sample is performed by the VAT service 130, the VAT service 130 may, in response to the payment authorization request and based on the attempted validation of the speech sample, provide an indication to the point-of-sale VAT system as to whether the transaction is authorized. In other such implementations, the VAT service 130 may only provide an indication as to whether the speech sample has been successfully validated, such that the point-of-sale VAT system 110 then determines whether the initiated transaction is authorized (e.g., if that determination is based on additional factors other than validation of the provided speech sample). As described above, if it is determined that the transaction is authorized, the point-of-sale VAT system 110 may provide one or more indications of that authorization to the customer 120. Alternatively, if it is determined that the transaction is not authorized, the point-of-sale VAT system 110 may provide a corresponding indication to the customer, and take additional actions. Based on the determination of whether the initiated transaction is authorized, the point-of-sale VAT system 110 and/or VAT service 130 may also perform various recordkeeping activities, such as by updating customer database 118, transaction database 119, customer database 142, or voice reference database 144.

In the illustration of FIG. 1, the network 101 may include a publicly accessible network of linked networks, possibly operated by various distinct parties, such as the Internet, although in other embodiments the network 101 may have other forms. For example, the network 101 may instead be a private network (e.g., intranet), such as, a corporate or university network that is wholly or partially inaccessible to non-privileged users. In still other embodiments, the network 101 may include both private and public networks, with one or more of the private networks having access to and/or from one or more of the public networks. Furthermore, the network 101 may include various types of wired and/or wireless networks in various situations. In addition, in the illustrated example of FIG. 1, the customer 120, the point-of-sale VAT system 110, and the remote data storage 140 may use various client computing systems to interact with the VAT service 130 to obtain various described functionality via the network 101, and in doing so may provide various types of information to the VAT service 130. Moreover, in certain embodiments, the various users and providers of the networked environment 100 may interact with the point-of-sale VAT system 110, VAT service 130, and other users and entities using an optional private or dedicated connection, such as one or more VPN (Virtual Private Network) connections.

As a third example described with reference to FIG. 1, in certain implementations the point-of-sale VAT system 110 may be operated by a merchant as part of an online e-commerce site, such as a Web site storefront associated with the merchant. In such implementations, the customer 120 may perform one or more interactions with a user interface of the merchant's associated Web site using a computing device of the customer (such as customer computing device 122) in order to initiate a sale or other transaction via the point-of-sale VAT system 110. The customer computing device 122 may comprise various types, which as a non-exclusive list of examples may include a portable email device, personal digital assistant, cell phone, smart phone, satellite phone, palmtop computing device, laptop, tablet computing device, game console, media player or other device with audible transceiver capabilities and that may include or combine capabilities of any or all of these.

Once the customer has indicated she wishes to initiate a sale or other transaction, the point-of-sale VAT system 110 may prompt the customer to provide a sample of her speech using a microphone (not shown) associated with the customer computing device. The client device generates at least some voice information by digitally recording the speech sample and forwarding the digital recording to the point-of-sale VAT system 110 via network links 105 and network 101. The voice information generator 114 may use the digital recording to generate one or more additional vocal metrics to use in validating the provided speech sample.

Continuing this third example, and in a manner similar to that described with respect to the second example above, the customer 120 provides an indication of her identity and relevant payment information to the point-of-sale VAT system 110. Also as described with respect to the second example, the point-of-sale VAT system 110 sends a payment authorization request to the VAT service 130, and may either provide the VAT service 130 with the generated voice information based on the customer's current speech sample for validation by the VAT service, or may receive voice reference information from the VAT service so that the speech sample may be validated by the point-of-sale VAT system. In either scenario, the point-of-sale VAT system 110 provides the VAT service 130 with the customer's indicated identity for use in retrieving the customer's associated voice reference information from the voice reference database 144 of remote data storage 140.

As above, if the validation of the speech sample is performed by the VAT service 130, the VAT service 130 may (in response to the payment authorization request and based on the attempted validation of the speech sample) provide an indication to the point-of-sale VAT system 110 as to whether the transaction is authorized, or only provide an indication as to whether the speech sample has been successfully validated, such that the point-of-sale VAT system 110 then determines whether the initiated transaction is authorized. In either case, if it is determined that the initiated transaction is authorized, the point-of-sale VAT system may provide one or more indications of that authorization to the customer 120 via the merchant Web site. Alternatively, if it is determined that the transaction is not authorized, an indication of that determination may be similarly provided to the customer and additional actions may be taken by the point-of-sale VAT system. As described elsewhere, the point-of-sale VAT system 110 and/or VAT service 130 may also perform various recordkeeping activities, such as by updating customer database 118, transaction database 119, customer database 142, or voice reference database 144.

As a fourth example described with reference to FIG. 1, in certain implementations the point-of-sale VAT system 110 may be operated as a VAT application (not shown) executing on a computing device associated with the customer 120, such as mobile device 122. For example, the executing VAT application may be associated with a financial institution for which payment information is securely stored on the associated computing device. Validation of a customer speech sample may be required in order to access the securely stored payment information for purposes of providing that payment information to a physical point-of-sale terminal, an online e-commerce site, or other interface, such as to initiate one or more financial or other transactions using such payment information.

In this example, in a manner similar to that described with respect to the point-of-sale VAT system 110 in the third example above, once the customer has indicated she wishes to initiate such a transaction, the executing VAT application may prompt the customer to provide a sample of her speech using a microphone (not shown) of the customer's client device 122. The executing VAT application uses voice information generator 114 (which, in this fourth example, is included as part of the executing VAT application) to generate voice information representative of the provided speech sample by digitally recording the speech sample and optionally generating additional vocal metrics based on the speech sample. The VAT application then attempts to validate the provided speech sample using the generated voice information and voice reference information that is associated with the customer identity and securely stored by the associated computing device in a manner similar to that described with respect to the first example above. Alternatively, the VAT application may provide the generated voice information to remote VAT service 130 along with an indication of the customer's identity (e.g., via network links 105 and network 101), such that the remote VAT service 130, rather than the client device 122, attempts to validate the provided speech sample.

If the provided speech sample is successfully validated, the executing VAT application may determine to provide the securely stored payment information for use in completing the customer-initiated transaction, or may require additional actions by the customer (e.g., providing other identity verification such as a password, fingerprint, etc.) in order to determine to provide that payment information. If the provided speech sample is not successfully validated, the executing VAT application may provide one or more indications to the customer accordingly. In addition, the executing VAT application may take one or more actions. For example, the executing VAT application may prevent further access to various functions of the associated computing device on which the that application is executing; may prompt the customer to provide an additional speech sample; may transmit one or more alerts indicating that the operator of the computing device has not been verified as the identified customer; etc.

In each of these examples and scenarios, interactions of entities with the VAT system 110 and/or VAT service 130 may occur in various ways. For example, the interaction may occur in an interactive manner or in programmatic manner via one or more software applications via an Application Program Interface ("API") 136 provided by the VAT service 130 that allows computing systems and/or programs to invoke such functionality programmatically, such as using Web services or other network communication protocols. In certain embodiments, merchants, banking services, or other service providers may integrate various functionality of the VAT system into their own provided services in such a programmatic manner. For example, service providers may allow programmatically submitting customer speech samples for validation, adding or updating customer information, associating new voice reference information with a customer identity (e.g., as part of enrolling the customer in a financial protection program associated with an entity operating the VAT system or VAT service, or with a third party that is associated with such operating entity), updating voice reference information already associated with a customer identity, or other functionality.

Similarly, interactions between the point-of-sale VAT system 110, VAT service 130, and/or the remote data storage service 140 may be performed manually, programmatically, or in some other fashion. In the illustrated embodiment, customer 120 may perform various interactions with the point-of-sale VAT system 110 and VAT service 130 using a Web browser, a client application, or mobile application. The client application or mobile application may be executing on the mobile device 122 or on some other computing system (not shown) of the customer. The client application or mobile application may be associated with, or provided by, an operator of the VAT service 130 or a financial institution associated with the VAT service.

The customer 120 may perform various interactions at one or more Web sites associated with the point-of-sale VAT system 110, the VAT service 130, or other entity (e.g., a merchant). For example, the customer may use a client computing device (not shown) to interact with the point-of-sale VAT system 110 or VAT service 130 over the network 101, such as to obtain Web pages or other electronic information from the VAT system, and/or to provide various information to the VAT system. The information obtained from or provided to the VAT system may include HTML-based information, or other groups of information that are formatted at least in part based on HTML or other electronic formats or markups. In certain implementations, the point-of-sale VAT system or VAT service may store various types of user information about such online interactions. For example, the VAT system or VAT service may record and store information about all interactions and activities performed by the user with respect to the point-of-sale VAT system or VAT service.

It will be appreciated that various details described with respect to FIG. 1 are provided for illustrative purposes, and may be different in other implementations. For example, the point-of-sale VAT system 110 or VAT service 130 may obtain and store other types of information (whether by storing additional types of information, and/or by not storing at least some of the described types of information), and the information may be stored in various manners. For example, such information may be stored in remote data storage 140, in a multi-tenant data warehouse or other database, in one or more additional remote storage devices operated by entities directly associated with the VAT service 130 or other third-party entities, in multiple distinct databases that are each specific to a type of data and/or to a particular vendor, etc. Furthermore, such information may be grouped in other manners than is illustrated or explicitly described. Similarly, the point-of-sale VAT system 110 and VAT service 130 may provide other types of functionality than those described, whether by providing additional types of functionality and/or by omitting at least some of the described types of functionality. The point-of-sale VAT system 110 and VAT service 130 may also provide various types of interfaces.

Figure 2:
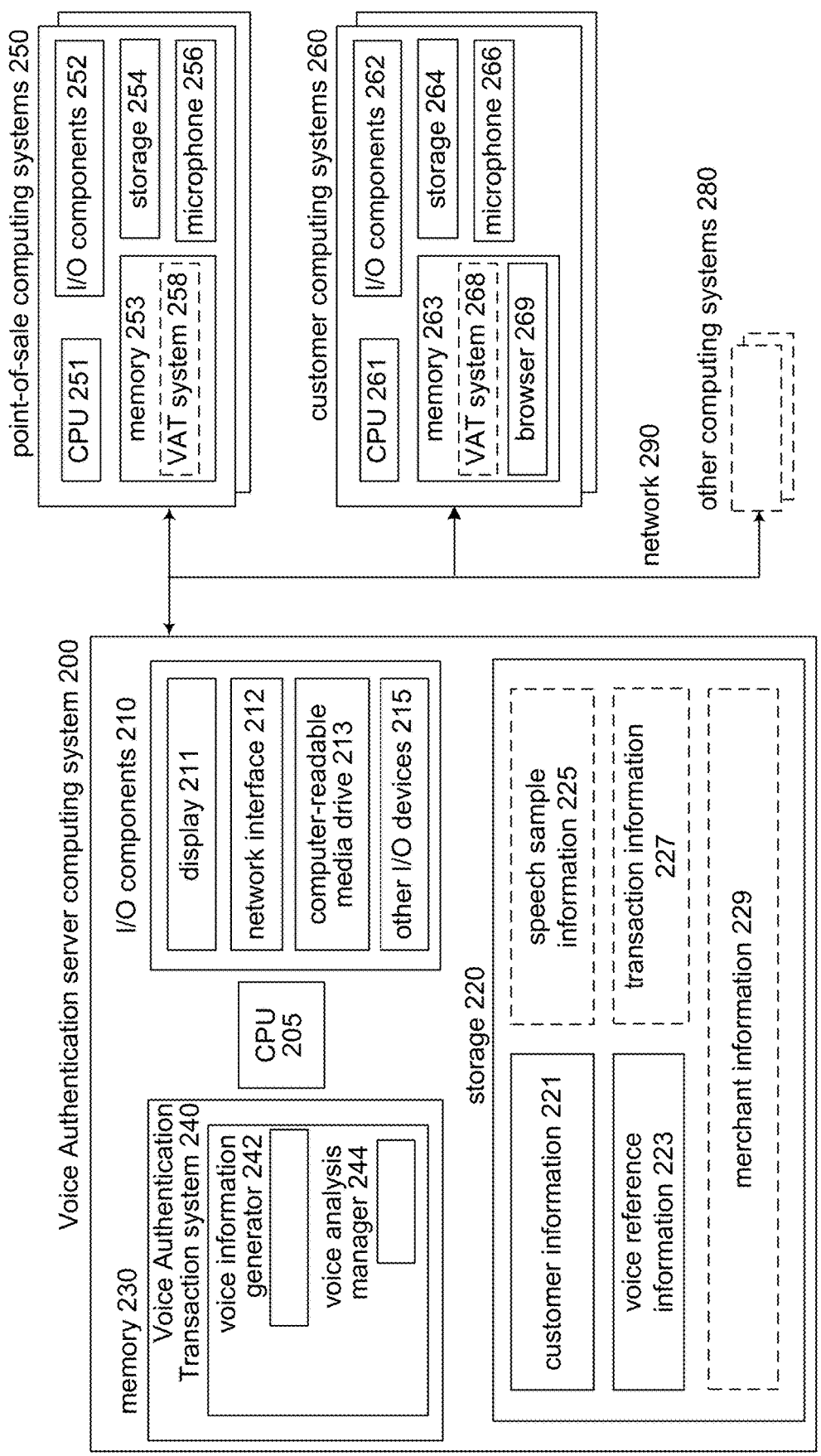
FIG. 2 is a block diagram illustrating an implementation of a computing system suitable for providing a Voice Authentication Transaction system in accordance with techniques described herein.

FIG. 2 is a block diagram illustrating a Voice Authentication server computing system 200 suitable for providing a Voice Authentication Transaction service in accordance with techniques described herein, such as by executing an embodiment of the VAT system 240. The computing system 200 includes one or more central processing units ("CPU") or other processors 205, various input/output ("I/O") components 210, storage 220, and a memory 230. The illustrated I/O components include a display 211, a network interface 212, a computer-readable media drive 213, and other I/O devices 215 (e.g., keyboards, mice or other pointing devices, microphones, speakers, GPS receivers, etc.). The Voice Authentication server computing system 200 and VAT system 240 may use one or more networks 290 to communicate with point-of-sale computing systems 250, customer computing systems 260, and other computing systems 280.

Some or all of these computing systems may similarly include some or all of the types of components illustrated for server computing system 200. For example, in a manner analogous to VAT system 240 executing in memory 230 of the server computing system 200, the point-of-sale computing system 250 may execute a VAT system 258 in memory 253, and customer computing system 260 may execute a VAT system 268 in memory 263. In addition, each of at least some of the point-of-sale computing systems 250 and the customer computing systems 260 may respectively include microphone 256 and 266. Each of at least some of the customer computing systems 260 may include a browser 269 executing in memory 263.

In the illustrated implementation, processor(s) 205 execute the VAT system 240 in order to perform at least some of the described techniques, such as to execute software instructions of the system 240 in a manner that configures the processor(s) 205 and computing system 200 to perform automated operations that implement those techniques. As part of such automated operations, the VAT system 240 executing in memory 230 may store and/or retrieve various types of data, including data structures stored in storage 220.

Such data structures may include various types of customer information in database ("DB") 221; voice reference information in DB 223; various types of speech sample information in DB 225; various types of transaction information in DB 227; and/or various types of merchant information in DB 229.

It will be appreciated that Voice Authentication server computing system 200 and computing systems 250, 260 and 280 are merely illustrative. Such systems may each instead include multiple interacting computing systems or devices, and may be connected to other devices that are not specifically illustrated. More generally, a device or computing system may comprise any combination of hardware that may interact and perform the described types of functionality, such as when programmed or otherwise configured with particular software instructions and/or data structures. A non-exclusive list of such hardware may include desktop or other computers (e.g., tablets, slates, etc.), database servers, network storage devices and other network devices, smart phones and other cell phones, consumer electronics, digital music player devices, handheld gaming devices, PDAs, wireless phones, pagers, electronic organizers, Internet appliances, television-based systems, and various other consumer products that include appropriate communication capabilities. In addition, the illustrated VAT systems 240, 258 and 268 may in some implementations be distributed in various modules other than those specifically depicted. Similarly, in some embodiments, the VAT systems 240, 258 and 268 may not provide all of the described functionality, and may provide additional functionality not specifically described.

It will also be appreciated that, while various items are illustrated as being stored in memory or on storage while being used, these items or portions of them may be transferred between memory and other storage devices for purposes of memory management and data integrity. In alternative implementations, some or all of the software modules and/or systems may execute in memory on another device and communicate with the illustrated computing systems via inter-computer communication. Thus, some or all of the described techniques may be performed by hardware that includes one or more processors and/or memory and/or storage when configured by one or more software programs (e.g., the VAT system 240, VAT system 258, and VAT system 268, respectively executing on any or all of computing systems 200, 250 and 260). Similarly, some or all of the described techniques may be performed by hardware executing software instructions of one or more software programs and/or by storage of such software instructions or various data structures. Furthermore, some or all of the systems and/or modules may be implemented or provided in other manners, such as at least partially in firmware and/or hardware (e.g., rather than as a means implemented in whole or in part by software instructions that configure a particular CPU or other processor). Such systems and/or modules may include, as non-limiting examples: application-specific integrated circuits (ASICs); standard integrated circuits; controllers (e.g., microcontrollers and/or embedded controllers); field-programmable gate arrays (FPGAs); complex programmable logic devices (CPLDs); etc. Some or all of the modules, systems and data structures may also be stored (e.g., as software instructions or structured data) on non-transitory computer-readable storage media. Such storage media may include a hard disk, flash drive, or other non-volatile storage device; volatile or non-volatile memory (e.g., RAM or flash RAM); a network storage device; a portable media article (e.g., a DVD disk, a CD disk, an optical disk, and/or a flash memory device) to be read by an appropriate drive or via an appropriate connection. The systems, modules and data structures may also be transmitted via generated data signals (e.g., as part of a carrier wave or other analog or digital propagated signal) on a variety of computer-readable transmission mediums, including wireless and wired/cable-based mediums, and may take a variety of forms (e.g., as part of a single or multiplexed analog signal, or as multiple discrete digital packets or frames). Such computer program products may also take other forms in other embodiments. Accordingly, implementations of the present disclosure may be practiced with other computer system configurations.

Figure 3:
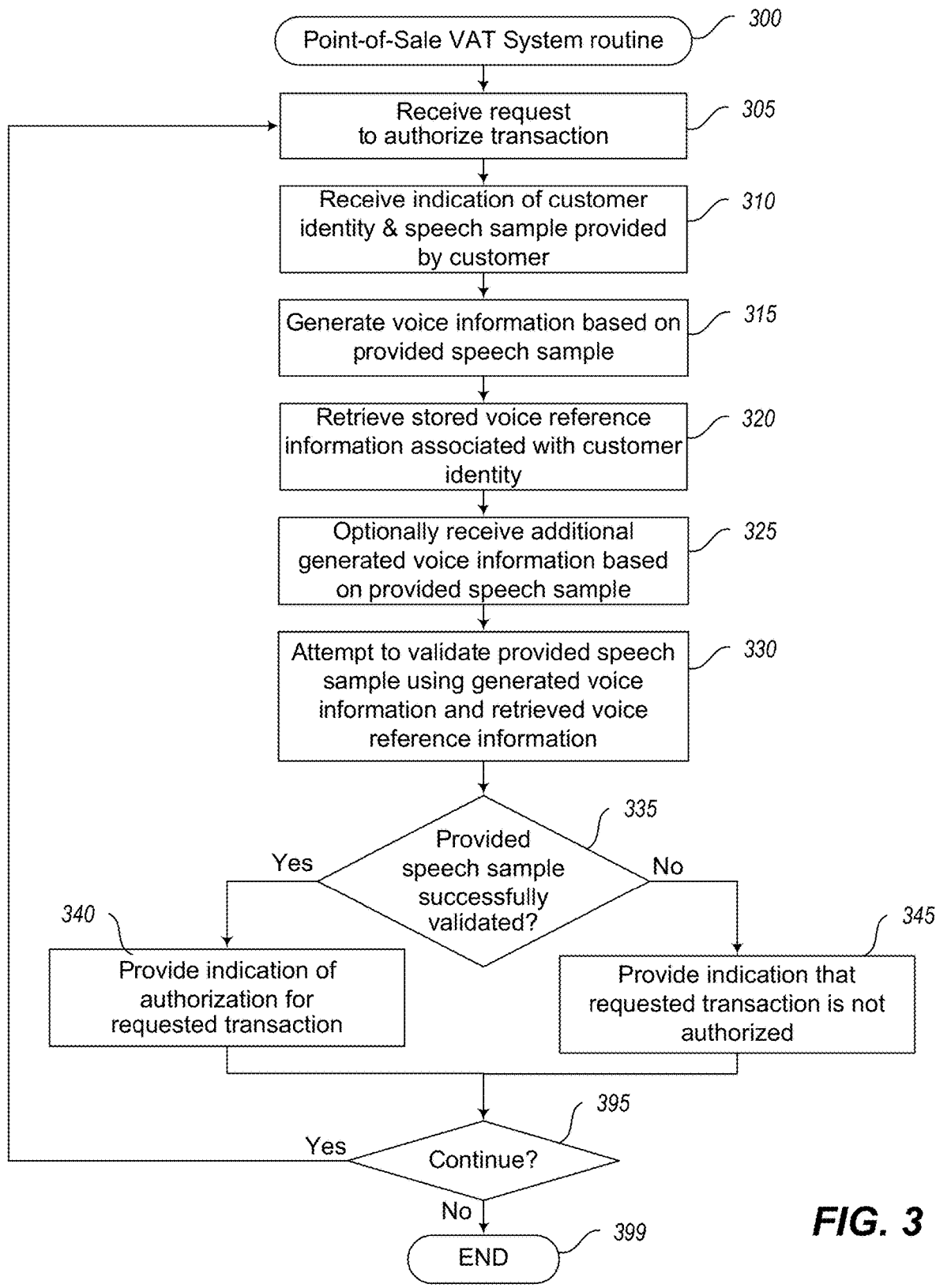
FIG. 3 is a flow diagram of an example method of operation of a point-of-sale terminal in accordance with techniques described herein.

FIG. 3 shows an example method 300 of operation of a point-of-sale VAT system, such as may be performed by one or more modules of the point-of-sale VAT system 110 of the networked environment 100 depicted by FIG. 1, and/or the VAT system 258 executed by the point-of-sale computing systems 250 of FIG. 2.

The method 300 starts at 305, in which a processor-based device receives a request to authorize a transaction in which an identity of one or more parties to the transaction are to be authenticated based at least in part on voice recognition of those one or more parties. At 310, either as part of the received request or separately, the processor-based device receives an indication of a customer identity associated with the received request and a sample of that customer's speech. At 315, responsive to receiving the provided speech sample, the processor-based device generates voice information based on that provided speech sample. Such voice information may be generated by the voice information generator 114 of FIG. 1. As described elsewhere herein, the generated voice information may include a digital recording of the provided speech sample, and in certain implementations may further include one or more vocal metrics based on that speech sample and/or other voice information generated based on that speech sample.

Following the generation of the voice information at 315, control advances to 320, where a processor-based device retrieves stored voice reference information associated with the customer identity as indicated at 310. In certain implementations, retrieving the stored voice reference information may include issuing a request to a remote data storage service (such as remote data storage service 140 of FIG. 1), issuing a request specifying the customer identity to a distinct or associated VAT service (such as VAT service 130 of FIG. 1), retrieving the stored voice reference information locally (such as by accessing local storage such as storage 254 of point-of-sale computing system 250 in FIG. 2), or in some other manner. At 325, a processor-based device optionally receives additional generated voice information based on the provided speech sample, such as if a remote VAT service has provided both the stored voice reference information as well as generated the additional voice information based on the voice information initially generated at 315.

In either case, at 330 a processor-based device attempts to validate the provided speech sample using the generated voice information and the retrieved voice reference information. At 335, a processor-based device determines whether the provided speech sample has been successfully validated. If so, at 340 a processor-based device provides one or more indications that the requested transaction is authorized. As described elsewhere herein, in certain implementations the method 300 may include one or more additional acts (such as validating other information associated with the indicated customer identity) prior to determining that the requested transaction is authorized. If the provided speech sample is not successfully validated at 335, then at 345 a processor-based device provides or causes to be provided one or more indications that the requested transaction is not authorized. As described elsewhere herein, in certain implementations a processor-based device may take one or more additional actions if the provided speech sample is not successfully validated, such as allowing the requesting customer to provide an additional speech sample for attempted validation or other appropriate activity.

Control passes to 395 where a processor-based device determines whether to continue, such as in response to an explicit indication to terminate. If it is to continue, control returns to 305 to await additional requests, and if not control passes to 399 where the method 300 ends.

Figure 4:
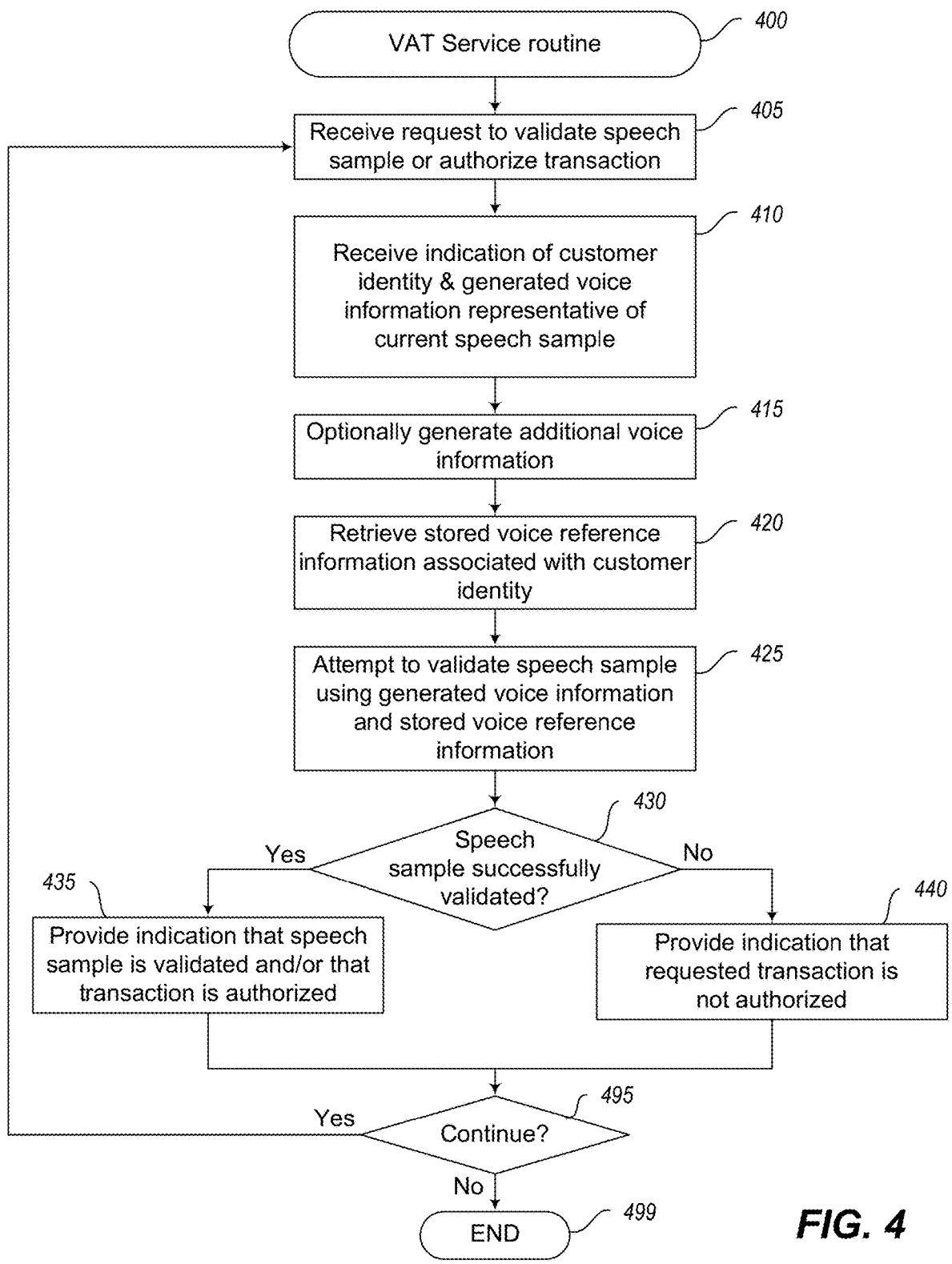
FIG. 4 is a flow diagram of an example method of operation of a Voice Authentication Transaction server in accordance with techniques described herein.

FIG. 4 shows an example method 400 of operation of a VAT service, such as may be performed by one or more components which implement a point-of-sale VAT service 130 of the networked environment 100 depicted by FIG. 1, and/or the VAT system 240 executed by the Voice Authentication server computing system 200 of FIG. 2.

The method 400 begins at 405, where a processor-based device receives a request to validate a speech sample and/or authorize a transaction. At 410, either as part of the request or separately, a processor-based device receives an indication of a customer identity associated with the received request and generates voice information representative of a speech sample purported to be provided by that customer. At 415, responsive to receiving the generated voice information, a processor-based device optionally generates additional voice information based on the received generated voice information, such as via voice information generator 132 of FIG. 1 or voice information generator 242 in FIG. 2. For example, as described elsewhere herein, the generated voice information may include a digital recording of the provided speech sample, and in certain embodiments the processor-based device may further generate one or more vocal metrics based on digital recording for use in validating the speech sample upon which the generated voice information is based.

At 420, a processor-based device retrieves stored voice reference information associated with the customer identity indicated at 410. In certain implementations, retrieving the stored voice reference information may include issuing a request to a remote data storage service (such as remote data storage service 140 of FIG. 1) or retrieving the stored voice reference information locally (such as by accessing voice reference information 223 within storage 220 of the Voice Authentication server computing system 200 in FIG. 2).

At 425, a processor-based device attempts to validate the provided speech sample using the generated voice information and the retrieved voice reference information. At 430, a processor-based device determines whether the speech sample represented by the generated voice information has been successfully validated. If so, control passes to 435, and a processor-based device provides one or more indications that the provided speech sample is validated, and/or that the requested transaction is authorized. As described elsewhere herein, in certain implementations a processor-based device may perform one or more additional acts, such as validating other information associated with the indicated customer identity, prior to determining that the requested transaction is authorized. If the provided speech sample is determined not to be successfully validated at 430, control passes to 440, in which a processor-based device provides one or more indications that the provided speech sample is not validated, and/or that the requested transaction is not authorized. As described elsewhere herein, in certain implementations a processor-based device may take one or more additional actions if the provided speech sample is not successfully validated, such as allowing the requesting customer to provide an additional speech sample for attempted validation or other appropriate activity.

After 435 or 440, control passes to 495 in which a processor-based device determines whether to continue, such as in response to an explicit indication to terminate. If it is to continue, control returns to 405 to await additional requests, and if not control passes to 499 where the method 400 ends.

It will be appreciated that in some implementations the functionality provided by the routines discussed above may be provided in alternative ways, such as being split among more methods or consolidated into fewer methods. Similarly, in some implementations, the illustrated methods may include more or less functionality than is described. In addition, while various actions may be illustrated as being performed in a particular order or manner (e.g., in serial or in parallel, or as synchronous or asynchronous), in other implementations such actions may be performed in other orders and in other manners. Any data structures discussed above may also be structured in different manners. For example, a single data structure may be split into multiple data structures, and/or multiple data structures may be consolidated into a single data structure. Similarly, in some implementations, illustrated data structures may store more or less information than is described, such as when other illustrated data structures lack or include such information, or when the amount or types of information that is stored is altered.

The foregoing detailed description has set forth various implementations via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

From the foregoing it will be appreciated that, although specific implementations have been described herein for purposes of illustration, various modifications may be made without deviating from the spirit and scope of the invention. Moreover, aspects and features of the various implementations of the techniques, features, functionality and related methods described above can be combined to provide further implementations. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects may be recited as being implemented via a non-transitory computer-readable medium at particular times, other aspects may likewise be so implemented.

What is claimed is:

1. A method to perform a transaction with voice authentication of a customer using a portable instrument of the customer at a merchant point-of-sale terminal, the merchant point-of-sale terminal including one or more processors and memory, the method comprising:
   receiving electronically from the portable instrument, by the point-of-sale terminal, an indication of an identity of the customer and securely stored payment information;
   providing a prompt to the customer to provide a sample of speech of the customer;
   capturing the speech sample using a microphone and digitally storing the speech sample in the memory of the point-of-sale terminal;
   performing voice recognition analysis to generate voice metrics quantitatively representing the digitally-stored speech sample;
   obtaining, during the transaction, voice reference information stored in the portable instrument, the voice reference information including reference voice metrics quantitatively representing a previous digitally-stored speech sample of the customer;
   analyzing, by the point-of-sale terminal, the generated voice metrics and the reference voice metrics obtained from the portable instrument to determine a likelihood that the captured speech sample corresponds to the previous digitally-stored speech sample of the customer;
   validating, by the point-of-sale terminal, the captured speech sample based upon whether the determined likelihood meets a defined threshold;
   providing an indication of authorization, by the point-of-sale terminal, via a network to a banking institution or payment service upon a successful validating of the captured speech sample;
   receiving further authorization information, by the point-of-sale terminal, via the network from the banking institution or payment service following the successful validating of the captured speech sample; and
   completing the performing of the transaction based on the received further authentication information.

2. The method of claim 1, wherein the customer provides the sample of speech via the microphone of the portable instrument of the customer.

3. The method of claim 1, wherein the providing of the indication of authorization, by the point-of-sale terminal, comprises providing the payment information.

4. The method of claim 1, wherein the portable instrument is a mobile device.

5. The method of claim 4, wherein the mobile device is a mobile phone.

6. The method of claim 1, wherein the portable instrument is a smartcard.

7. The method of claim 1, wherein if the captured speech sample is not successfully validated, the point-of-sale terminal prompts the customer to provide an additional speech sample.

8. The method of claim 1, wherein if the captured speech sample is not successfully validated, the point-of-sale terminal prompts the customer to use an alternate method of authorization.

9. The method of claim 1, wherein the voice reference information is stored in a secure database of the portable instrument.

10. The method of claim 1, wherein the point-of-sale terminal declines to complete the performing of the transaction if the captured speech sample is not successfully validated.

11. The method of claim 1, wherein the providing of the prompt to the customer to provide the sample of speech comprises displaying a message on a display of the point-of-sale terminal.

12. The method of claim 1, wherein the receiving from the portable instrument of the indication of the identity of the customer and the securely stored payment information comprises electronically receiving a first portion of information from a mobile device and a second portion of information from a smartcard.

13. A system to perform a transaction with voice authentication of a customer using a portable instrument of the customer at a merchant point of sale, the system comprising:
   a point-of-sale terminal including one or more processors, and
   memory storing a set of instructions that, as a result of execution by the one or more processors, cause the system to perform:
      receiving electronically from the portable instrument, by the point-of-sale terminal, an indication of an identity of the customer and securely stored payment information;
      providing a prompt to the customer to provide a sample of speech of the customer;
      capturing the speech sample using a microphone and digitally storing the speech sample in the memory of the point-of-sale terminal;
      performing voice recognition analysis to generate voice metrics quantitatively representing the digitally-stored speech sample;
      obtaining, by the point-of-sale terminal during the transaction, voice reference information stored in the portable instrument, the voice reference information including reference voice metrics quantitatively representing a previous digitally-stored speech sample of the customer;

analyzing, by the point-of-sale terminal, the generated voice metrics and the reference voice metrics obtained from the portable instrument to determine a likelihood that the captured speech sample corresponds to the previous digitally-stored speech sample of the customer;

validating, by the point-of-sale terminal, the captured speech sample based upon whether the determined likelihood meets a defined threshold;

providing an indication of authorization, by the point-of-sale terminal, via a network to a banking institution or payment service upon the successful validating of the captured speech sample;

receiving further authorization information, by the point-of-sale terminal, via the network from the banking institution or payment service following the successful validating of the captured speech sample; and completing the performing of the transaction based on the received further authentication information.

14. The system of claim 13, wherein the customer provides the sample of speech via the microphone of the portable instrument of the customer.

15. The system of claim 13, wherein the providing of the indication of authorization, by the point-of-sale terminal, comprises providing the payment information.

16. The system of claim 13, wherein the portable instrument is a mobile device.

17. The system of claim 16, wherein the mobile device is a mobile phone.

18. The system of claim 13, wherein the portable instrument is a smartcard.

19. The system of claim 13, wherein if the captured speech sample is not successfully validated, the point-of-sale terminal prompts the customer to provide an additional speech sample.

20. The system of claim 13, wherein if the captured speech sample is not successfully validated, the point-of-sale terminal prompts the customer to use an alternate method of authorization.

21. The system of claim 13, wherein the voice reference information is stored in a secure database of the portable instrument.

22. The system of claim 13, wherein the point-of-sale terminal declines to complete the performing of the transaction if the captured speech sample is not successfully validated.

23. The system of claim 13, wherein the providing of the prompt to the customer to provide the sample of speech comprises displaying a message on a display of the point-of-sale terminal.

24. The system of claim 13, wherein the receiving from the portable instrument of the indication of the identity of the customer and the securely stored payment information comprises electronically receiving a first portion of information from a mobile device and a second portion of information from a smartcard.

* * * * *